United States Patent

Heismann et al.

(10) Patent No.: US 6,427,364 B1
(45) Date of Patent: Aug. 6, 2002

(54) ARRANGEMENT FOR HEATING AIR SUPPLIED TO A CARBURETOR OF A SNOW THROWER ENGINE

(75) Inventors: Richard A. Heismann, Warrensburg, MO (US); Dennis N. Stenz, Mt. Calvary, WI (US); Joseph T. Pawlak, Lombard, IL (US)

(73) Assignees: Murray, Inc., Brentwood, TN (US); Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/633,860

(22) Filed: Aug. 7, 2000

Related U.S. Application Data

(60) Provisional application No. 60/148,398, filed on Aug. 18, 2001.

(51) Int. Cl.[7] .............................. E01H 4/00; F01P 1/02
(52) U.S. Cl. ....................................... 37/219; 123/41.7
(58) Field of Search ................................ 123/546, 556, 123/523, 590, 547, 41.7; 56/17.5, 320.1, 12.8; 38/219, 226, 242, 244, 257, 259

(56) References Cited

U.S. PATENT DOCUMENTS

| | | |
|---|---|---|
| 1,131,016 A | 3/1915 | Thornton |
| 1,434,445 A | 11/1922 | Lind |
| 1,933,365 A | 10/1933 | Chandler .................... 123/122 |
| 2,334,561 A | 11/1943 | Kopplin ..................... 123/122 |
| 3,245,390 A | 4/1966 | Roorda .................... 123/142.5 |
| 3,498,280 A | 3/1970 | Zimmerer .................. 123/122 |
| 3,678,973 A | 7/1972 | Loop ........................ 143/32 R |
| 3,881,452 A | 5/1975 | Dilworth .................... 123/1 A |
| 4,211,058 A | * 7/1980 | Larsen ........................ 56/17.5 |
| 4,233,043 A | 11/1980 | Catterson ..................... 55/315 |
| 4,294,027 A | * 10/1981 | Edwards ....................... 37/219 |
| 4,312,318 A | 1/1982 | Davis ......................... 123/546 |
| 4,535,746 A | 8/1985 | Otani ......................... 123/556 |
| 4,846,136 A | 7/1989 | Phillips ...................... 123/556 |
| 4,848,294 A | 7/1989 | Yamamoto ................. 123/198 |
| 4,890,595 A | 1/1990 | Fischer ....................... 123/556 |
| 5,076,247 A | 12/1991 | Schmidt ..................... 123/556 |

FOREIGN PATENT DOCUMENTS

DE  37 26 164 A1  2/1989

* cited by examiner

*Primary Examiner*—Robert E. Pezzuto
(74) *Attorney, Agent, or Firm*—Kevin E. Joyce

(57) ABSTRACT

A snow thrower engine carburetor is covered by a heater box provided with a channel through which air passes so as to be heated by the engine's muffler. The heated airstream is changed in direction as it leaves the heater box and moves towards the carburetor whereby moisture carried in the airstream is separated therefrom before the heated air reaches the carburetor.

34 Claims, 5 Drawing Sheets

ARRANGEMENT FOR HEATING AIR SUPPLIED TO A CARBURETOR OF A SNOW THROWER ENGINE

This application claims the benefit of U.S. Provisional Application No. 60/148,398, filed Apr. 18, 2001.

BACKGROUND OF THE INVENTION

1. Field of the Invention

The present invention relates to an arrangement for directing to the carburetor of a snow thrower engine air which is warmed by the engine's exhaust.

2. Prior Art

Conventional snow thrower engines are provided with carburetors which are supplied with ambient air. In addition to the air typically being at low temperature, moisture often is included in the air supply, usually in the form of snow. The result is that it is difficult to operate the snow thrower's engine in such conditions.

SUMMARY OF THE INVENTION

The present invention provides an arrangement whereby air supplied to a snow thrower's engine is directed past the engine's muffler which causes the air to be heated. Additionally, the air is passed through a plenum to cause the air flow to change direction whereby moisture carried by the airstream is separated therefrom before the air reaches the engine's carburetor.

BRIEF DESCRIPTION OF THE DRAWINGS

The invention now will be described in greater detail with respect to the accompanying drawings wherein.

DETAILED DESCRIPTION OF A PREFERRED EMBODIMENT OF THE INVENTION

Figure 1:
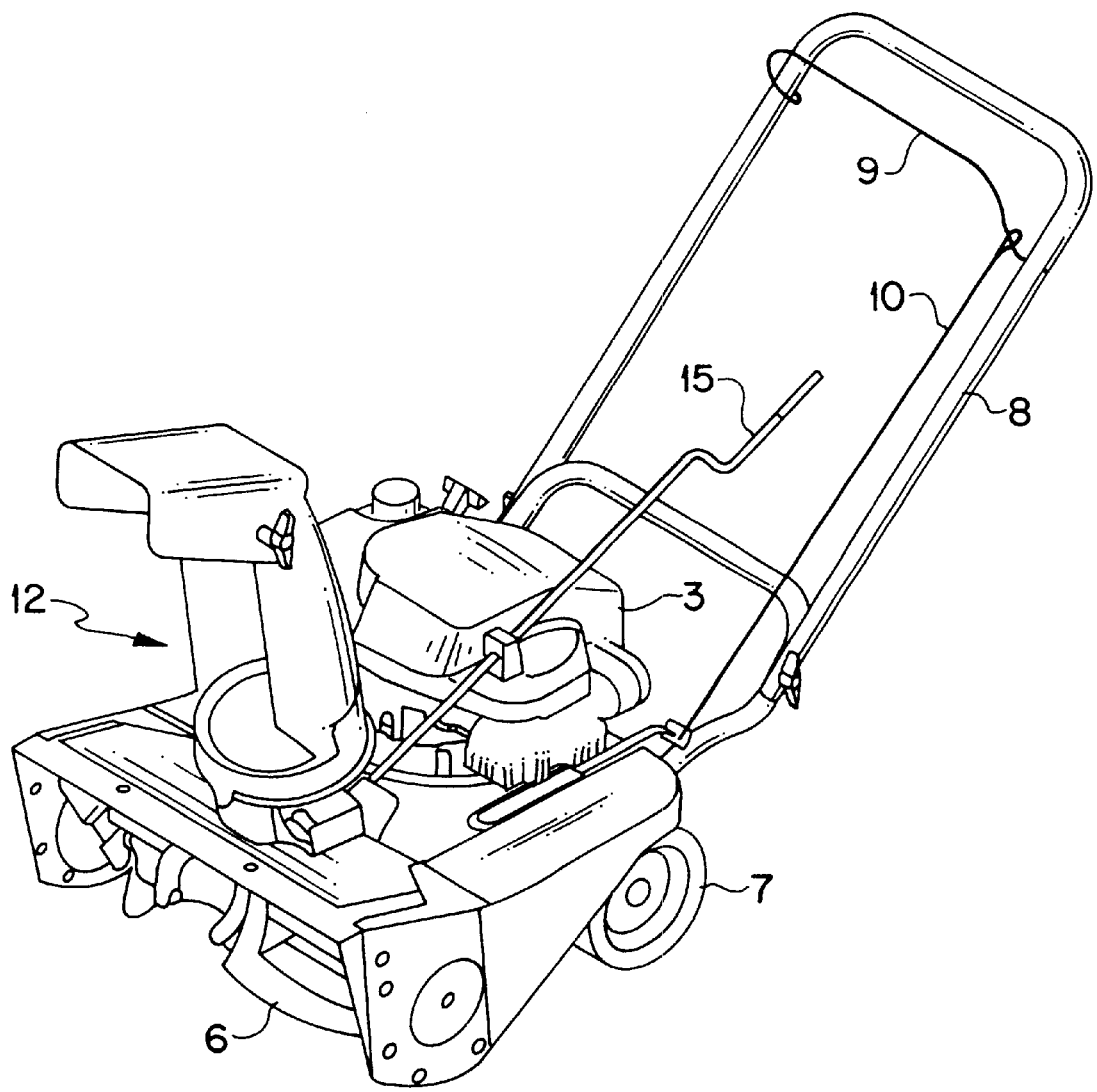
FIG. 1 is a perspective view of a snow thrower incorporating the present invention.

Referring to FIG. 1, a housing-supported engine located beneath a cover 3 is provided with a vertical output drive shaft (not shown) which passes through the upper surface of a housing. The output shaft is connected to an auger 6, supported within a forward portion of the housing, by a drive connection (not shown). The rear portion of the housing is supported by wheels 7. A handle 8 extends rearwardly of the housing. A control bar 9 is pivotally connected to the upper portion of handle 8 and is capable of being actuated by an operator. The control bar 9 is connected by a cable 10 to the drive connection between the engine's output drive shaft and auger 6. During operation of the engine, the operator selectively actuates the control bar 9 to complete the drive connection whereby snow is moved by the auger and is discharged from the housing through a discharge port provided in the housing above the central portion of auger 6. An adjustable discharge chute 12 is joined to the port to direct snow thrown by auger 6. A control rod 15 extends from one of its ends, positioned adjacent to handle 8, to a worm gear (not shown) which is joined to the rod's opposite end. The worm gear is positioned in operative relationship with chute 12 to cause the chute to rotate about a vertical axis in response to actuation of control rod 15 to thereby control the direction of snow discharged from the snow thrower and the distance the snow is thrown.

Figure 2:
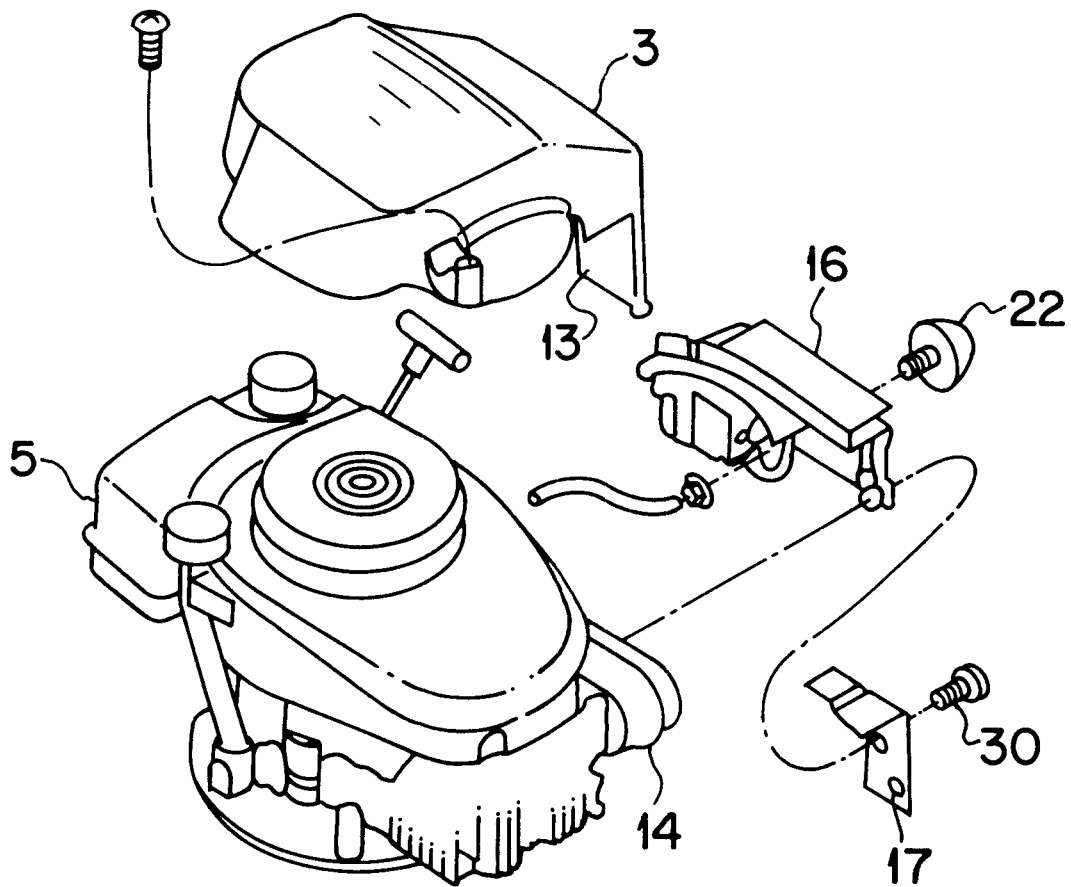
FIG. 2 is a view of a portion of the snow thrower shown in FIG. 1 illustrating, in exploded fashion, an engine, engine cover, and a carburetor heating arrangement.

Referring to FIG. 2, the appearance of engine 5 can be appreciated as a result of cover 3 being separated from the engine. The engine includes a muffler 14 positioned on one side of the engine. During operation of the snow thrower engine, air surrounding the muffler is heated, and the heated air is directed to the engine's carburetor to prevent it from freezing. This is accomplished by the combined effect of: a portion 13 of cover 3 which extends downwardly to partially overlap muffler 14; a heater box 16 which is secured to a side of engine 5; a muffler shield 17 which is attached to one end of heater box 16 and which is interposed between muffler 14 and portion 13 of cover 3; and an additional portion of cover 3 which encloses the end of heater box 16 opposite that to which shield 17 is attached. These elements retain air heated by the muffler and direct it to the engine's carburetor (not shown) in a manner now to be described.

Figure 3:
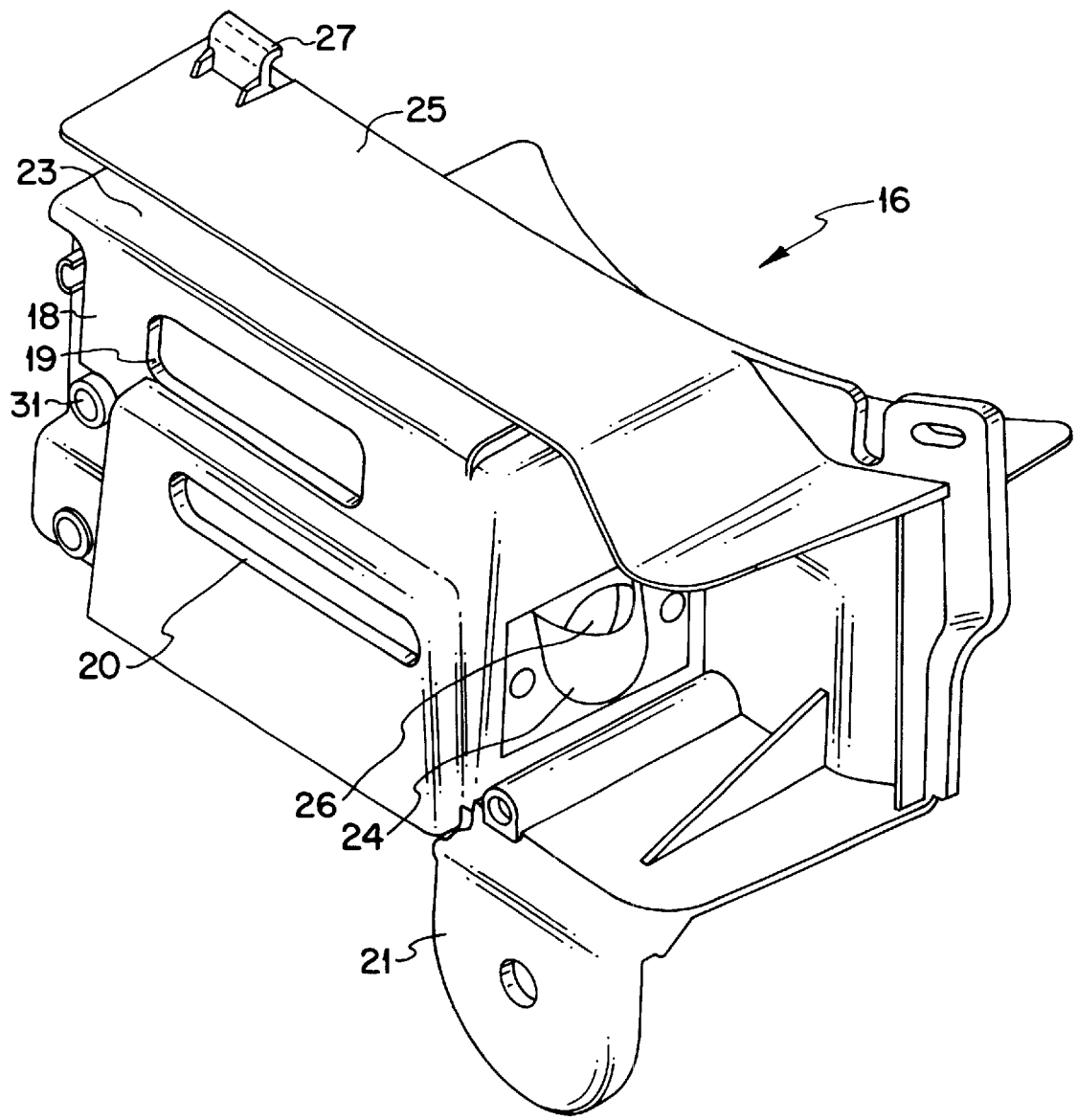
FIG. 3 is a perspective view of a heater box portion of the arrangement shown in FIG. 2.

FIG. 3 illustrates the heater box 16 in greater detail. A body portion 18 is formed to cover the engine's carburetor and controls. Portion 18 includes a pair of spaced slots 19 and 20 which receive, respectively, ignition and choke control levers (not shown). Portion 18 further includes an ear 21 to which a fuel primer button 22 (FIG. 2) is secured. The top surface 23 of body portion 18 provides a surface defining the bottom of a channel extending between the muffler 14, located at one end of portion 18, and an air flow director element 24 secured to the opposite end of portion 18. Heater box 16 additionally is formed to include a plate portion 25 positioned above, and in spaced parallel relationship with, surface 23. However, portion 25 projects beyond that end of body portion 18 to which the air flow director element 24 is secured. The projecting portion is bent downwardly so that air flowing along the channel defined by surface 23 and plate portion 25 is deflected towards the open top of element 24. Inasmuch as element 24 is mounted over an aperture 26 in body portion 18, air entering element 24 changes direction and passes through aperture 26 so as to be directed towards the carburetor which underlies the heater box.

Figure 4:
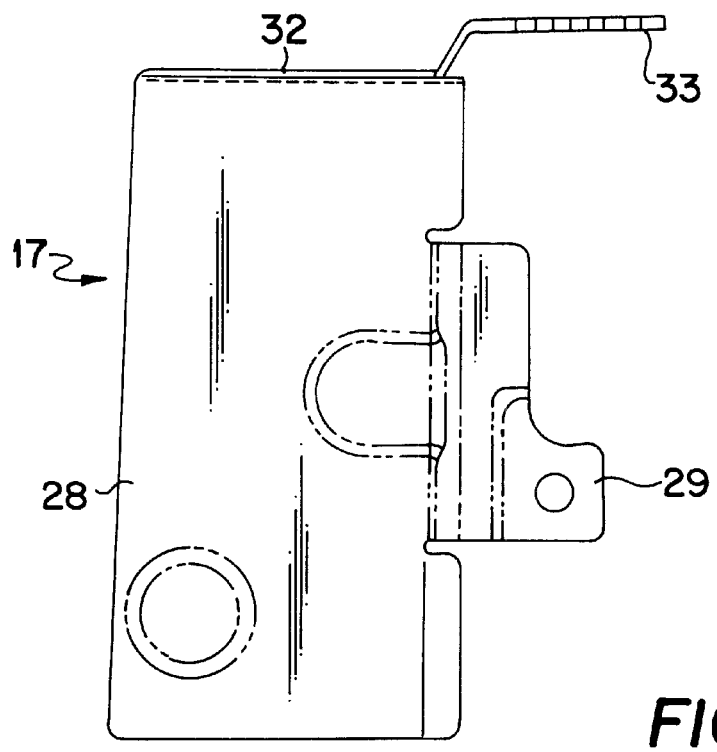
FIG. 4 is a side elevational view of a muffler shield shown in FIG. 2 and used in association with the heater box shown in FIG. 3.

The plate portion 25 of heater box 16 additionally is provided on its upper surface with a projecting tab 27. This tab is employed to secure the top part of the muffler shield 17 to the heater box 16, as now will be described with reference to FIGS. 4 and 5.

Figure 5:
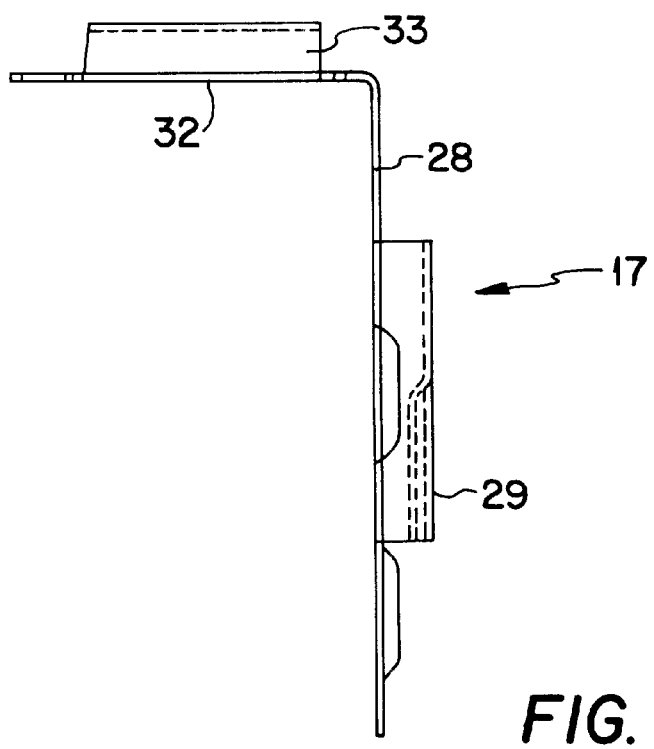
FIG. 5 is an end elevational view of the muffler shield illustrated in FIG. 4.

Shield 17 comprises a metallic sheet generally formed in an inverted L-shape (FIG. 5). The major portion 28 is provided with a tab 29 adapted to permit shield 17 to be secured in side-by-side relationship with the heater box 16 by means of a fastener 30 (FIG. 2) passing through tab 29 and being introduced within opening 31 in the heater box. An upper portion 32 of shield 17 includes a projecting portion 33 having a slot for receiving tab 27 of the heater box 16. When joined to the heater box as just described, shield 17 partially overlaps muffler 14, and its upper portion 32 is substantially in planar alignment with plate portion 25 of the adjacent heater box.

With cover 3 in place, the end of heater box opposite that to which shield 17 is joined is overlapped by the cover so as to form a plenum adjacent the air flow director element 24. Thus, air is heated by muffler 14 as the air is directed by the upper portion 32 of the muffler shield, and then by the channel between surface 23 and plate portion 25 of the heater box, into the plenum which, in cooperation with the air flow director element 24, directs the warmed air to a carburetor located behind the heater box. The supply of warmed air prevents the carburetor from freezing when the snow thrower is operating in cold weather. Additionally, because of the changes in direction of the airstream as it passes the muffler and travels to the carburetor, moisture carried by the air is deposited within the plenum so as not to reach the carburetor.

Of course, only a portion of muffler 14 is overlapped by muffler shield 17 and cover 3. Thus, the exhaust from the engine is permitted to escape to atmosphere from an uncovered end of the muffler.

The cover 3 preferably is formed as a molded plastic piece. When joined to engine 5, portion 13 of cover 3 is on the opposite side of muffler shield 17 from muffler 14. Consequently, the major portion 28 of shield 14 serves as a barrier to prevent heat from the muffler and the exhaust from melting portion 13 of the cover.

Figure 6:
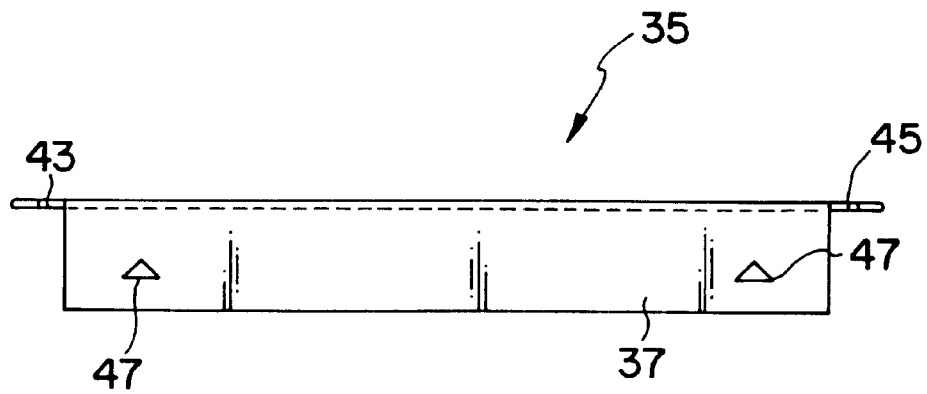
FIG. 6 is a side elevational view of a channel member used in association with the heater box shown in FIG. 3.
Figure 7:
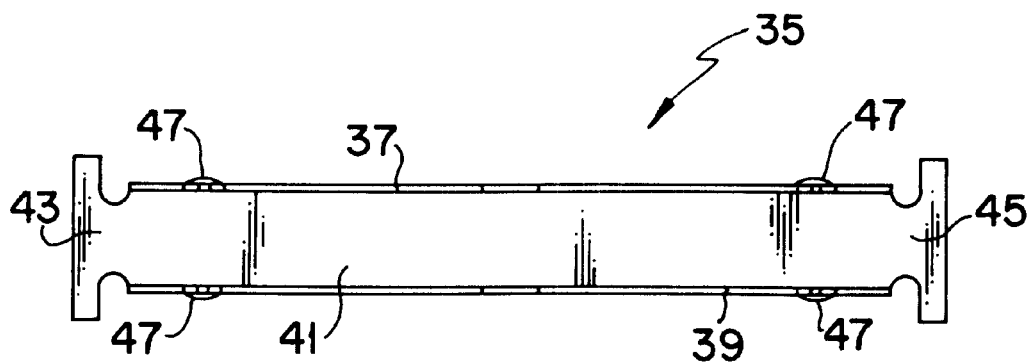
FIG. 7 is a bottom plan view of the channel member shown in FIG. 6.

The above description of the invention suggests that the air flow channel formed by heater box 16 is open-sided. However, this is not the case. More particularly, as shown in FIGS. 6 and 7, a channel cover 35 is provided to contain the airstream which passes between surface 23 and plate portion 25 of the heater box. Cover 35 includes a substantially U-shaped body comprising a pair of spaced parallel walls 37 and 39 joined by a web 41. The web is provided at its ends with t-shaped stop portions 43 and 45 which project beyond the planes of walls 37 and 39. Additionally, the walls include friction detents 47. Walls 37 and 39 are spaced by a distance which permits the walls to be inserted between surface 23 and plate portion 25 of heater box 16 with the detents 47 engaging surface 23 and portion 25 so as to functionally retain cover 35 in place. The stop portions engage surface 23 and portion 25 whereby web 41 closes the side of the air flow channel.

What is claimed is:

1. An arrangement for supplying heated air to a carburetor of a snow thrower engine by directing the air past a muffler of the engine, said arrangement comprising:

a heater box joined to said engine adjacent the carburetor and the muffler, said heater box having a first end positioned adjacent the muffler and being formed with a channel extending from said first end to a plenum located adjacent an opposite end of the heater box for receiving air heated by the muffler and directing the heated air to the plenum which changes the direction of movement of the heated air before the air reaches the carburetor.

2. An arrangement according to claim 1, wherein said heater box is formed to include two spaced portions which form the channel, one of said portions being provided, at said opposite end of the heater box adjacent the plenum, with a projecting portion extending into the plenum and formed to deflect heated air received from the channel.

3. An arrangement according to claim 2, further comprising a channel cover extending between the two spaced portions of the heater box which form the channel therein, said channel cover closing a side of the channel.

4. An arrangement according to claim 2, wherein the heater box includes an end wall forming a portion of said plenum, the end wall being provided with an aperture through which heated air deflected by said projecting portion passes as the air moves towards said carburetor.

5. An arrangement according to claim 4, wherein an air flow director element is secured to said end wall of the heater box in a position adjacent said aperture for further changing the direction of movement of the heated air passing through the plenum and the aperture.

6. An arrangement according to claim 2, further comprising a muffler shield joined to the heater box at said first end and partially overlapping the muffler, said shield including a portion which is substantially planar aligned with one of said spaced portions of the heater box to assist in directing air heated by the muffler into the heater box channel.

7. An arrangement according to claim 2, wherein said plenum is formed between said opposite end and said projecting portion of the heater box and an engine cover secured to the engine.

8. A snow thrower, comprising:

an engine having a carburetor and a muffler;

a heater box joined to said engine adjacent the carburetor and the muffler, said heater box being formed with a passageway which includes a channel for receiving air heated by the muffler and directing the heated air to a plenum which changes the direction of movement of the heated air before directing the air to said carburetor.

9. A snow thrower according to claim 8, wherein said heater box includes a body portion for at least partially covering the carburetor.

10. A snow thrower according to claim 9, wherein said body portion includes at least one slot for receiving an engine control lever.

11. A snow thrower according to claim 8, wherein said heater box is formed to include two spaced portions which form the channel, one of said portions being provided, at one end of the heater box adjacent the plenum, with a projecting portion extending into the plenum and formed to deflect heated air received from the channel.

12. A snow thrower according to claim 11, wherein the heater box includes an end wall forming a portion of said plenum, the end wall being provided with an aperture through which heated air deflected by said projecting portion passes as the air moves towards said carburetor.

13. A snow thrower according to claim 12, wherein an air flow director element is secured to said end wall of the heater box in a position adjacent said aperture for further changing the direction of movement of the heated air passing through the plenum and the aperture.

14. A snow thrower according to claim 11, further comprising a muffler shield joined to the heater box at an opposite end thereof and partially overlapping the muffler, said shield including a portion which is substantially planar aligned with one of said spaced portions of the heater box to assist in directing air heated by the muffler into the heater box channel.

15. A snow thrower according to claim 11, wherein said plenum is formed between said projecting portion of the heater box and an engine cover secured to the engine.

16. A snow thrower according to claim 11, further comprising a channel cover extending between the two spaced portions of the heater box which form the channel therein, said channel cover closing a side of the channel.

17. A snow thrower according to claim 7, wherein said engine includes a vertically oriented drive shaft.

18. A snow thrower according to claim 8, further comprising an engine cover secured to the engine and overlapping at least a portion of said heater box in cooperative relationship therewith for directing heated air to the carburetor.

19. A snow thrower according to claim 18, wherein said engine includes a vertically oriented drive shaft.

20. A snow thrower according to claim 18, wherein said heater box is formed to include two spaced portions which form the channel, one of said portions being provided, at one end of the heater box adjacent the plenum, with a projecting portion extending into the plenum and formed to deflect heated air received from the channel.

21. A snow thrower according to claim 20, further comprising a channel cover extending between the two spaced portions of the heater box which form the channel therein, said channel cover closing a side of the channel.

22. A snow thrower according to claim 20, wherein said plenum is formed between said opposite end and said projecting portion of the heater box and an engine cover secured to the engine.

23. A snow thrower according to claim 20, wherein the heater box includes an end wall forming a portion of said plenum, the end wall being provided with an aperture through which heated air deflected by said projecting portion passes as the air moves towards said carburetor.

24. A snow thrower according to claim 23, wherein an air flow director element is secured to said end wall of the heater box in a position adjacent said aperture for further changing the direction of movement of the heated air passing through the plenum and the aperture.

25. A snow thrower according to claim 20, further comprising a muffler shield joined to the heater box at an opposite end thereof and partially overlapping the muffler, said shield including a portion which is substantially planar aligned with one of said spaced portions of the heater box to assist in directing air heated by the muffler into the heater box channel.

26. An engine for a snow thrower, comprising:

a carburetor and a muffler;

a heater box joined to said engine adjacent the carburetor and the muffler, said heater box being formed with a passageway which includes a channel for receiving air heated by the muffler and directing the heated air to a plenum which changes the direction of movement of the heated air before directing the air to said carburetor.

27. An engine according to claim 26, wherein the heater box includes a projecting portion extending between the heater box and the engine, the projecting portion being disposed in a substantially horizontal plane at a level above that, of the carburetor.

28. An engine according to claim 26, wherein the engine includes a vertically oriented drive shaft.

29. An engine according to claim 26, wherein said heater box is formed to include two spaced portions which form the channel, one of said portions being provided, at one end of the heater box adjacent the plenum, with a projecting portion extending into the plenum and formed to deflect heated air received from the channel.

30. An engine according to claim 29, further comprising a channel cover extending between the two spaced portions of the heater box which form the channel therein, said channel cover closing a side of the channel.

31. An engine according to claim 29, further comprising a muffler shield joined to the heater box at an opposite end thereof and partially overlapping the muffler, said shield including a portion which is substantially planar aligned with one of said spaced portions of the heater box to assist in directing air heated by the muffler into the heater box channel.

32. An engine according to claim 29, wherein the heater box includes an end wall forming a portion of said plenum, the end wall being provided with an aperture through which heated air deflected by said projecting portion passes as the air moves towards said carburetor.

33. An engine according to claim 32, wherein an air flow director element is secured to said end wall of the heater box in a position adjacent said aperture for further changing the direction of movement of the heated air passing through the plenum and the aperture.

34. An engine according to claim 29, wherein said plenum is formed between said projecting portion of the heater box and an engine cover secured to the engine.

* * * * *